(12) United States Patent
Valin

(10) Patent No.: US 6,216,330 B1
(45) Date of Patent: Apr. 17, 2001

(54) METHOD OF SLEEVING AN AT LEAST LOCALLY CYLINDRICAL PART INTO A TUBULAR PART IN A CRUCIFORM ARRANGEMENT

(75) Inventor: Daniel Valin, Saint-Amand-sur-Fion (FR)

(73) Assignee: Vallourec Composants Automobiles Vitry, Vitry-le-Francois (FR)

( * ) Notice: Subject to any disclaimer, the term of this patent is extended or adjusted under 35 U.S.C. 154(b) by 0 days.

(21) Appl. No.: 09/210,731

(22) Filed: Dec. 15, 1998

Related U.S. Application Data

(62) Division of application No. 08/781,817, filed on Jan. 10, 1997, now Pat. No. 5,882,139.

(30) Foreign Application Priority Data

Jan. 10, 1996 (FR) .................................................. 96 00229

(51) Int. Cl.⁷ ........................................................ B23P 19/02
(52) U.S. Cl. ........................... 29/525; 29/522.1; 29/451; 29/235
(58) Field of Search .................................. 29/522.1, 450, 29/451, 235, 525, FOR 522.1, FOR 450, FOR 451, FOR 235

(56) References Cited

U.S. PATENT DOCUMENTS

| | | | |
|---|---|---|---|
| 1,981,720 | * | 11/1934 | Crane . |
| 2,057,648 | * | 10/1936 | Kiefner . |
| 2,141,892 | * | 12/1938 | Wilson . |
| 2,197,680 | * | 4/1940 | Boorman .............................. 29/522.1 |
| 2,301,244 | * | 1/1942 | Bishop . |
| 2,344,717 | * | 3/1944 | Mills et al. . |
| 2,542,144 | * | 2/1951 | Kearns . |
| 2,586,946 | * | 2/1952 | Haas ...................................... 29/522.1 |
| 2,640,618 | * | 6/1953 | Hale ...................................... 29/524.1 |
| 2,657,894 | * | 11/1953 | Sklenar ................................... 29/451 |
| 2,884,283 | * | 4/1959 | Korol et al. . |
| 3,318,413 | | 5/1967 | Werner et al. . |
| 3,354,987 | | 11/1967 | Werner et al. . |
| 3,404,504 | | 10/1968 | Taylor . |
| 3,500,956 | | 3/1970 | Lindesmith et al. . |
| 3,528,525 | | 9/1970 | Lindesmith et al. . |
| 3,545,072 | | 12/1970 | Lindesmith . |
| 4,389,134 | | 6/1983 | Colas . |
| 4,597,687 | | 7/1986 | Colas . |
| 4,656,721 | * | 4/1987 | Werner . |
| 4,934,885 | * | 6/1990 | Woods et al. . |
| 4,967,879 | | 11/1990 | Klafs et al. . |
| 5,177,854 | * | 1/1993 | Herbert et al. ....................... 29/522.1 |
| 5,547,041 | | 8/1996 | Morral Gispert . |

FOREIGN PATENT DOCUMENTS

| | | |
|---|---|---|
| 383303 | 8/1989 | (CH) . |
| 0036377 | 9/1981 | (EP) . |
| 2528132 | 12/1983 | (FR) . |
| 2090550 | 7/1982 | (GB) . |

* cited by examiner

*Primary Examiner*—S. Thomas Hughes
*Assistant Examiner*—Steve Blount
(74) *Attorney, Agent, or Firm*—Young & Thompson

(57) ABSTRACT

An assembly is formed of two parts sleeved together in a cruciform arrangement, namely an at least locally cylindrical part and a tubular part having a transverse hole into which the cylindrical part is forcibly inserted. To brace internally the wall of the tubular part on the side from which the cylindrical part is inserted, before such insertion a spacer is inserted into the tubular part through the hole in it and thereafter extends along a portion of the perimeter of the hole. Applications include the assembly of two parts.

9 Claims, 3 Drawing Sheets

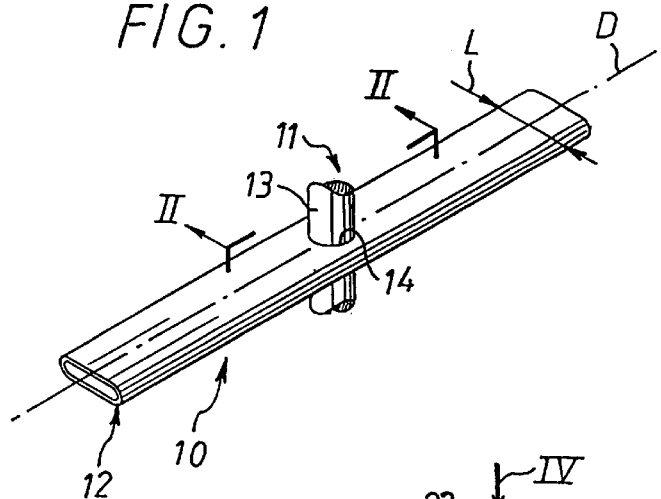
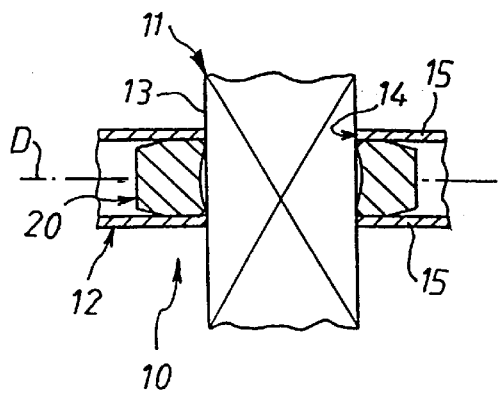
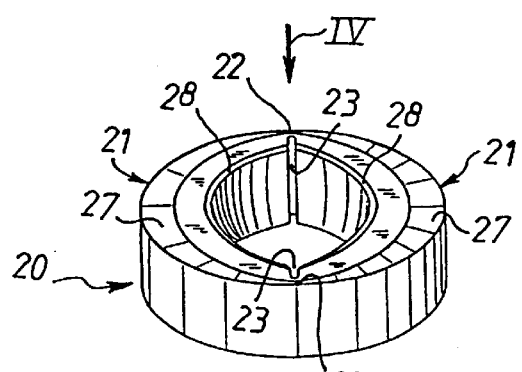
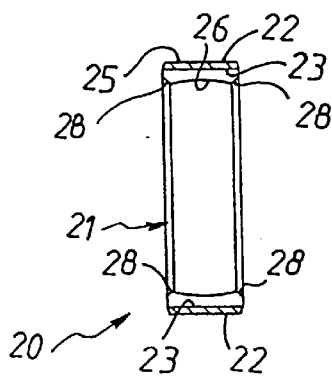
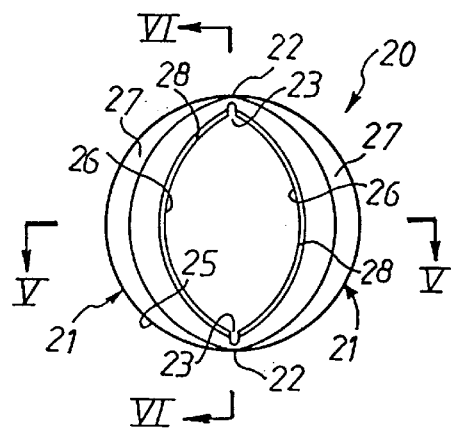
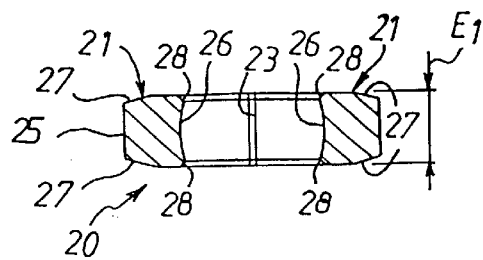

METHOD OF SLEEVING AN AT LEAST LOCALLY CYLINDRICAL PART INTO A TUBULAR PART IN A CRUCIFORM ARRANGEMENT

CROSS-REFERENCE TO RELATED APPLICATIONS

This application is a division of copending application Ser. No. 08/781,817, filed Jan. 10, 1997U.S. Pat. No. 5,882, 139

BACKGROUND OF THE INVENTION

1. Field of the Invention

The present invention is generally concerned with sleeving an at least locally cylindrical part into a tubular part in a cruciform arrangement, i.e. sleeving the cylindrical part into the tubular part in a direction that is globally transverse to the lengthwise direction of the latter.

In the present context the expression "at least locally cylindrical" is to be understood as referring to a part having an exterior surface which is, at least locally, where it is sleeved into the tubular part, a cylindrical surface, i.e. a surface which has parallel generatrices regardless of the nature, circular or otherwise, of the contour of its cross-section.

This at least locally cylindrical part, which will be referred to hereinafter for convenience as the cylindrical part, may be solid, hollow or tubular.

In the case of a hollow or tubular part, it may accommodate at least one other component of any kind.

2. Description of the Prior Art

The assemblies formed of a cylindrical part of this kind sleeved into a tubular part find applications in assembling the parts together, for example in the manufacture of automobiles.

A hole is made through the tubular part adapted to envelope the overall contour of the cylindrical part and, for example in a press, the cylindrical part and the tubular part are conjointly caused to move relative to each other so that the cylindrical part is forcibly inserted into the hole in the tubular part from one side of the latter while the tubular part is braced externally on the opposite side.

Because of its tubular structure, the tubular part has two walls around the hole.

During the sleeving of the cylindrical part, the wall on the side from which the cylindrical part is inserted is the first to be subjected to the sleeving force and in practice it may be deformed to some degree because of this.

As a result of this, the cross-section of the tubular part around its hole is modified, at least locally, which may compromise the quality of the mechanical connection normally obtained between the cylindrical part and the tubular part and, in any event, the visible deformation of the tubular part can only cast doubt on this quality.

It is therefore usually necessary to discard the assembly formed in this way if the tubular part that it includes shows any signs of such deformation.

A general object of the present invention is an arrangement that has the advantage of preventing such deformation.

SUMMARY OF THE INVENTION

To be more precise, in a first aspect, the present invention consists in a method of forcibly sleeving an at least locally cylindrical part into a tubular part globally transversely to the latter, wherein, a hole enveloping the overall contour of said cylindrical part passing through said tubular part, said cylindrical part and said tubular part are conjointly caused to move relative to each other so that said cylindrical part is forcibly inserted in said hole in said tubular part from one side of the latter whilst said tubular part is braced externally on the opposite side, in which method, before insertion of said cylindrical part into said hole in said tubular part, a spacer is inserted into said tubular part through said hole and is adapted to brace it internally near said hole, along at least a portion of the perimeter thereof, said spacer inserted in said tubular part in this way remaining therein afterwards.

This spacer may be inserted into the tubular part from either end.

However, apart from the fact that, for completeness, this would require time-consuming and complex work at both ends of the tubular part, it is impossible if the tubular part is an elongate part, for example, i.e. a part that is sufficiently long for the hole into which the cylindrical part must be inserted to be too far away from either end for it to be reached from either end.

The method of the invention therefore inserts the spacer into the tubular part through the hole into which the cylindrical part must be inserted.

In practice, in the method in accordance with the invention, to achieve this the spacer is first inserted axially in the hole in the tubular part and is then radially expanded between the two walls of the tubular around the hole.

Be this as it may, because of the presence of the spacer within the tubular part before the cylindrical part is inserted into its hole, the wall of the tubular part that is on the side from which the cylindrical part is inserted is advantageously braced internally, which is very effective in preventing any deformation of it.

In other aspects, the present invention also consists in a tool for inserting a spacer of this kind and any assembly of two parts sleeved together in a cruciform arrangement, i.e. a cylindrical part and a tubular part having a transverse hole into which the cylindrical part is forcibly inserted, which includes, between the two walls of the tubular part around the hole, a spacer that extends around at least a portion of the perimeter of said hole.

The objects of the invention, their features and their advantages will emerge from the following description given by way of example with reference to the accompanying diagrammatic drawings.

BRIEF DESCRIPTION OF THE DRAWINGS

FIG. 1 is a perspective view of an assembly formed of two parts sleeved together in a cruciform arrangement by a method in accordance with the invention.

FIG. 2 is a view of this assembly to a larger scale and in longitudinal section on the line II—II in FIG. 1.

FIG. 3 is a perspective view of the spacer used in accordance with the invention, shown in its initial state.

FIG. 4 is a plan view of the spacer, as seen in the direction of the arrow IV in FIG. 3.

FIGS. 5 and 6 are respectively views in axial section on the lines V—V; and VI—VI in FIG. 4

DETAILED DESCRIPTION OF THE PREFERRED EMBODIMENTS

As shown in the figures, the overall aim is to produce an assembly 10 which, as seen most clearly in FIG. 1, is formed of two parts sleeved together in a cruciform arrangement, namely a cylindrical part 11 and a tubular part 12.

As explained hereinabove, the cylindrical part 11 is generally defined as a part the exterior surface 13 of which is a cylindrical surface, at least locally, where it is sleeved into the tubular part 12.

In the embodiment shown, the cross-section of this exterior surface 13 is circular and continuous.

It could equally well have some other contour, however, and/or be discontinuous to a greater or lesser degree.

In the embodiment shown the cylindrical part 11 is solid, in the manner of a rod.

However, it could equally well be a hollow part, for example a tubular part, like the tubular part 12.

Figure 9:
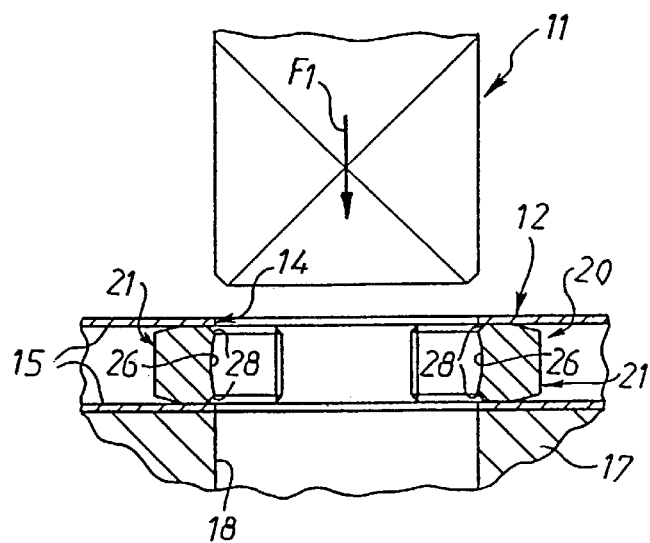
FIG. 9 is a partial view in longitudinal section, similar to those of FIGS. 7A, 7B, 7C and 7D, showing the forcible insertion of the cylindrical part into the hole in the tubular part.

This is why its outline is marked with crossed lines, in the conventional way, in FIGS. 2 and 9.

If the cylindrical part 11 is a tubular part with a circular cross-section, it can provide a hub for a shaft of any kind or house a hub of this kind.

In the embodiment shown, the tubular part 12 is an elongate part, for example.

Figure 8:
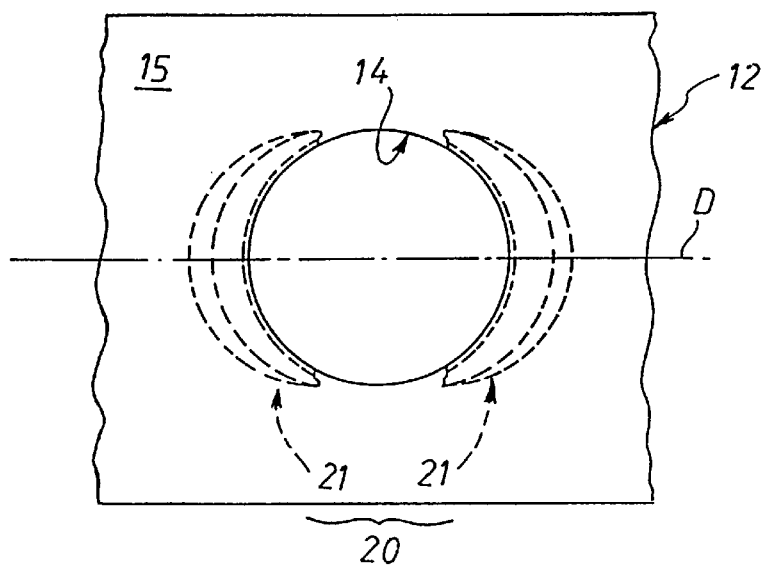
FIG. 8 is a plan view of part of the tubular part equipped with the spacer, as seen in the direction of the arrow VIII in FIG. 7D.

In other words, in this embodiment, it is a part which is elongate in a lengthwise direction D shown in chain-dotted line in FIGS. 1, 2 and 8 and is also thin.

Its cross-section and its thickness can be uniform or vary.

In the embodiment shown the tubular part 12 is rectilinear or substantially rectilinear.

This is not necessarily so, however.

To the contrary, this tubular part 12 can also be curved or bent to a greater or lesser extent.

The tubular part 12 has, globally transversely to it, more specifically to its lengthwise direction D, a hole 14 for the cylindrical part 11, passing completely through it, enveloping the overall contour of the cylindrical part 11 and into which the cylindrical part 11 is forcibly inserted.

In the embodiment shown, the hole 14 is at a distance from both ends of the tubular part 12.

This is not necessarily so, however.

In the embodiment shown, the tubular part 12 forms a bar the cross-section of which, uniform over all of its length, is globally flattened like a buttonhole, substantially perpendicular to the generatrices of the cylindrical part 11.

This is not necessarily so either, however.

To the contrary, the cross-section of the tubular part 12 can be of any kind and/or vary along its length.

It is sufficient for it to have a width L perpendicular to the generatrices of the cylindrical part 11 sufficient to receive the cylindrical part 11.

Be this as it may, the tubular part 12 has two walls 15 around the hole 14.

In the embodiment shown, and given what has been stated above, these two walls 15 are substantially plane and parallel to each other, at least near the hole 14.

However, this is not necessarily so.

In the embodiment shown, the walls are also substantially perpendicular to the generatrices of the cylindrical part 11.

This is not necessarily so either, however.

In a manner that is known in itself, for sleeving the cylindrical part 11 into the tubular part 12, as shown in FIG. 9, the cylindrical part 11 and the tubular part 12 are conjointly caused to move relative to each other so that the cylindrical part 11 is forcibly inserted into the hole 14 in the tubular part 12, from one side of the latter, in the direction of the arrow F1 in FIG. 9, with the tubular part 12 braced externally on the opposite side.

In practice this operation is carried out on a press.

As shown in FIG. 9, the tubular part 12 then rests on the table 17 of the press, appropriately attached to the latter with the hole 14 vertically aligned with a complementary opening 18 in the table 17, and the cylindrical part 11 is attached to the piston, not shown, of the press.

In accordance with the invention, a spacer 20 is inserted into the tubular part 12 before the cylindrical part 11 is inserted into the hole 14 in the latter, to brace it internally near the hole 14 along at least a portion of the perimeter of the hole; accordingly, the spacer is matched to the shape and/or the cross-section of the profile of the tubular part 12 near the hole 14, so that the spacer 20 when fitted into the tubular part 12 is then retained permanently in the latter.

As shown here, the spacer 20 is preferably formed by at least two annular segments 21, so that it can expand radially, for reasons explained below.

In the embodiment shown more particularly in FIGS. 1 through 9, there are only two segments 21 and, the spacer 20 being globally annular, each subtends an angle of substantially 180°.

Furthermore, in this embodiment, as shown in FIGS. 3 through 6, the segments 21 are initially attached to each other in the circumferential direction in a separable manner.

To this end, the spacer 20 in practice includes, at the ends of a diameter, two areas 22 of reduced strength produced by two grooves 23 which run its full height on its inside edge.

The outside edge 25 of the spacer 20, to be more precise that of each of its segments 21, preferably has an overall contour in plan view similar to that of the hole 14 in the tubular part 12.

In the embodiment shown, the external edge 25 of the spacer 20 therefore has a circular contour the same diameter as the hole 14 in the tubular part 12.

Likewise, the spacer 20 has an inside edge 26, to be more precise that of each of its segments 21, with an overall contour in plan view similar to that of the hole 14 in the tubular part 12.

In the embodiment shown, the inside edge 26 of the spacer 20 therefore also has a circular contour with the same radius as the hole 14 in the tubular part 12.

Finally, the spacer 20 is preferably adapted to be wedged between the two walls 15 of the tubular part 12 around the hole 14.

As shown here, for example, the spacer 20, to be more precise each of its segments 21, has an insertion bevel 27 at its external edge on at least one face, in practice on both faces.

In the embodiment shown, the insertion bevel 27 has a crescent-shape contour in plan view (see FIGS. 3 and 4).

Be this as it may, the insertion bevels 27 of the same segment 21 on the opposite faces of the spacer 20 converge in the direction from the inside of the spacer 20 to its outside.

Figure 7A:
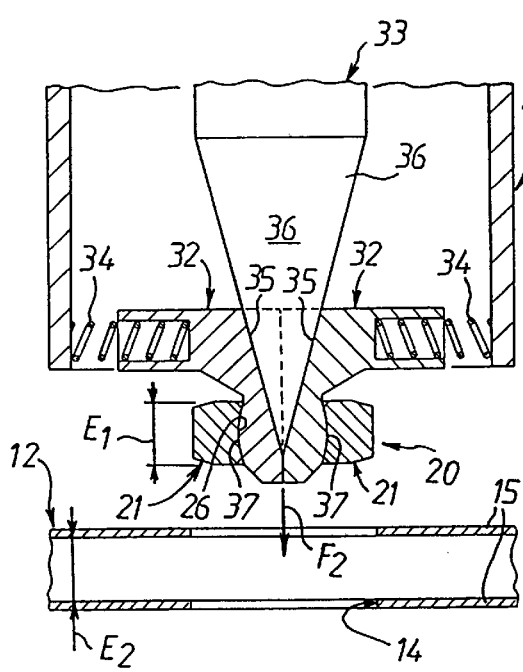
FIGS. 7A, 7B, 7C and 7D are partial views in longitudinal section, similar to that of FIG. 2, showing to a different scale various successive stages in the fitting of the spacer of the invention between the two walls of the tubular part into which it must be inserted.

The thickness E1 of the spacer 20 from one of its faces to the other, ignoring the insertion bevels 27, (see FIGS. 5 and 7A) is substantially equal to the distance E2 between the insides of the two walls 15 of the tubular part 12 around the hole 14 when unstressed, being in practice slightly greater than this distance E2 (see FIG. 7A).

In the embodiment shown, the spacer 20, to be more precise each of the segments 21 of the latter, also has a bevel 28 on its inside edge on at least one face, in practice both faces.

The bevel 28 is very much smaller in the radial direction than the insertion bevels 27.

The bevels 28 of the same segment 21 on the opposite faces of the spacer 20 converge in the direction from the outside of the spacer 20 to its inside.

In the embodiment shown, and for reasons that emerge hereinafter, the inside edge 26 of the spacer 20, to be more precise that of each of its segments 21, has a concave profile in axial section.

As shown here, for example, the axial section of this inside edge 26 is circular.

The spacer 20 utilized in accordance with the invention is made from a hard synthetic material resistant to compression, for example.

In the embodiments shown, it has a plane of symmetry perpendicular to its axis, i.e. perpendicular to the axis of the ring that it forms.

In accordance with the invention, this spacer 20 is inserted into the tubular part 12 through the hole 14 in the latter.

Figure 7B:
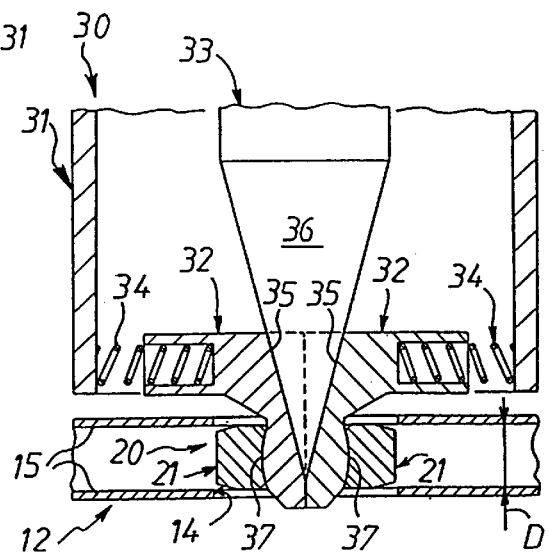
Figure 7C:
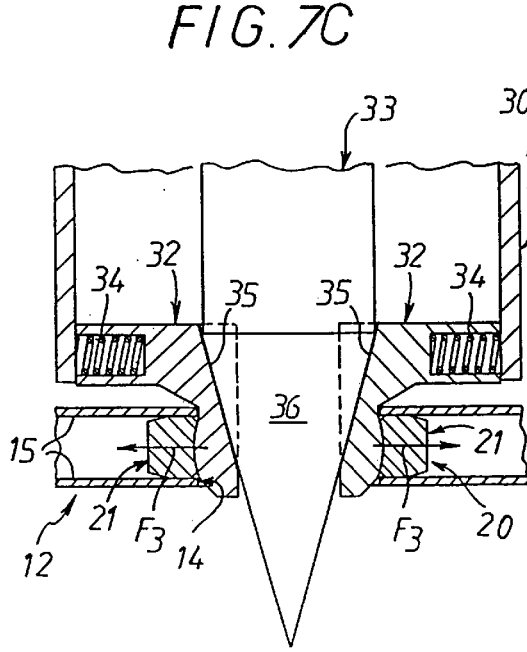

In more detail, for insertion of the spacer 20 into the tubular part 12, by the method in accordance with the invention, the spacer 20 is first inserted axially into the hole 14 in the tubular part 12, in the direction of the arrow F2 in FIG. 7A, and is then expanded radially between the two walls 15 of the tubular part 12 around the hole 14, in the direction of the oppositely directed arrow F3 An FIG. 7C.

It may be inserted using a tool 30 of the type shown diagrammatically in FIGS. 7A, 7B, 7C and 7D, for example.

The tool 30, which operates in the manner of a manipulator, includes a support 31, for example in the form of a box section open at the bottom, at least two jaws 32 mobile radially on the support 31 between a close together position in which, as shown in FIGS. 7A and 7B, they are adapted conjointly to receive the inside edge 26 of the spacer 20, and a spaced apart position in which, as shown in FIG. 7C, they are adapted to insert the spacer 20 into the tubular part 12, with operating means 33 adapted to actuate the jaws 32.

In practice the jaws 32 are spring-loaded at all times towards their close together position by springs 34 which bear on the support 31; they have on their inside edge a conical or frustoconical surface 35 and the operating means 33 comprise a cam which has a conical or frustoconical surface 36 complementary to their conical or frustoconical surface 35 and is adapted to be inserted between them.

In the embodiment shown, complementary nesting means are provided between the spacer 20 and each of the jaws 32 for retaining the spacer 20 on the jaws 32.

In practice, these complementary nesting means are obtained by virtue of the fact that the external edge of the jaws 32 forms a projecting surface 37 with a convex profile complementary to the concave profile of the inside edge 26 of the segments 21 of the spacer 20.

Initially, the spacer 20 is simply forcibly fitted over the jaws 32, which are in the close together position shown in FIG. 7A, without breaking its areas 22 of reduced strength.

Carried by the jaws 32, the spacer 20 is then inserted into the hole 14 in the tubular part 12, in the direction of the arrow F2 in FIG. 7A, until it lies within the interior volume of the tubular part 12, at equal distances from the walls 15 around the hole 14, as shown in FIG. 7B.

The operating means 33 are then actuated to move the jaws 32 apart, as shown in FIG. 7C, which subjects the spacer 20 to a radial expansion force causing the segments 21 constituting it to separate from each other and to be forcibly engaged between the walls 15 of the tubular part 12.

The spacer 20 of the invention fitted in this way through the hole 14 in the tubular part 12, is then thus fragmented circumferentially into as many separate segments 21 as it initially comprises, i.e. two segments 21 in this example.

Figure 7D:
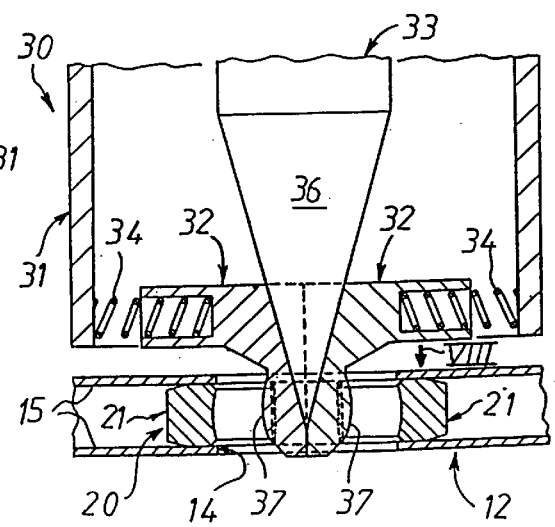

Withdrawal of the operating means 33 then returns the jaws 32 to the close together position as shown in FIG. 7D, and the support 31 is then withdrawn to leave room for the cylindrical part 11, as shown in FIG. 9.

Because of its thickness E1 and the bevels 28 on it, the spacer 20, to be more precise the segments 21 that constitute it, when inserted into the tubular part 12, push the walls 15 of the tubular part 12 slightly apart.

As a result, they are then subjected to an axial clamping force by relaxation of the walls 15 and in practice this axial clamping force is sufficient to hold them in place.

Because of the circular contour of its outside edge 25, the spacer 20 fits closely in the hole 14 in the tubular part 12 whilst having a maximal external diameter and, because of the circular contour of its internal hole 26, the segments 21 obtained from it then fit closely to the contour of the hole 14, lying as close as possible to the latter.

As can be seen in FIG. 8, the spacer 20 is preferably expanded in the lengthwise direction D of the tubular part 12, at one end at least of the diameter of the hole 14 in the latter parallel to the lengthwise direction D.

In practice, as shown in FIG. 8, the segments 21 of the spacer 20 locate at respective opposite ends of this diameter.

FIG. 8 shows that, in the embodiment shown, the spacer 20 formed of the segments 21 extends along at least two-thirds of the perimeter of the hole 14 in the tubular part 12.

When the cylindrical part 11 is inserted in the hole 14 in the tubular part 12, the segments 21 of the spacer 20 advantageously brace internally the wall 15 of the tubular part 12 on the same side as the cylindrical part 11, bearing on the opposite side on the wall 15, which is in turn braced externally by the table 17 of the press.

The segments 21 of the spacer 20 then constitute lost parts which remain inside the assembly 10 produced in this manner.

It is readily understandable that if the segments 21 encroach slightly on the hole 14 in the tubular part 12, once fitted as described above, they are pushed further back into the latter by the cylindrical part 11 when the latter is sleeved into it, and the bevel 28 on their inside edge 26 facilitates this.

As is also readily understandable, given its symmetry perpendicular to its axis, the spacer 20 is advantageously reversible and can be used either way up.

Figure 10:
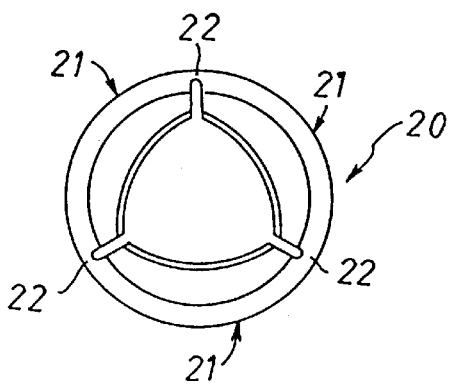
FIG. 10 is a plan view similar to that of FIG. 4, showing a different embodiment of the spacer of the invention.
Figure 11:
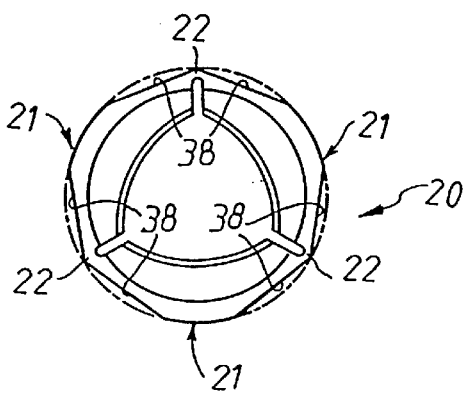
FIG. 11 is a plan view of a further embodiment of the spacer.

In the embodiments shown in FIGS. 10 and 11 the spacer 20 is formed of three segments 21 that are initially attached together circumferentially in a separable manner by areas 22 of reduced strength.

Further, in the embodiment shown in FIG. 11, the segments 21 have on their outside edge 25 flats 38 forming a dihedron between them.

Otherwise the arrangements are the same as previously.

However, when fitted, the spacer 20 is more uniformly distributed around the hole 14 in the tubular part 12.

Of course, the present invention is not limited to the embodiments described and shown, or to the use described and shown, but naturally encompasses any variant execution thereof.

In particular, the hole in the tubular part does not necessarily match in all respects the shape of the periphery of the cylindrical part.

In other words, there is not necessarily a continuous contact between the hole and the periphery at all points.

It is sufficient for the overall contour of the hole in the tubular part to envelope the overall contour of the periphery, i.e. the cross-section, of the cylindrical part.

Further, instead of being initially in one piece with each other, the component segments of the spacer of the invention may originally be separate parts, being held together by a surrounding elastic band, for example.

Like the segments themselves, this elastic band then forms a lost part.

There is claimed:

1. A method of forcibly sleeving together two parts in a cruciform arrangement, which comprises:

providing an at least locally cylindrical part;

providing a tubular part extending in a lengthwise direction, and having two walls and a hole transverse said lengthwise direction for enveloping the overall contour of said cylindrical part;

inserting a spacer axially into said tubular part through said hole, then radially expanding said spacer between the two walls of said tubular part around said hole, thereby bracing said tubular part, internally near the hole along at least a portion of the perimeter of the hole; said spacer inserted in said tubular part remaining therein afterwards; and thereafter conjointly causing said cylindrical part and said tubular part to move relative to each other so that said cylindrical part is forcibly inserted in said hole in said tubular part from one side of the latter, while said tubular part is braced externally on an opposite side.

2. The method claimed in claim 1 wherein said spacer inserted into said tubular part is expanded in the lengthwise direction thereof.

3. The method claimed in claim 1 wherein said spacer is adapted to be wedged between the two walls of said tubular part around said hole.

4. The method claimed in claim 3 wherein said spacer has an insertion bevel on its external edge on at least one face.

5. The method claimed in claim 1 wherein said spacer is made from a hard synthetic material resistant to compression.

6. The method claimed in claim 1 wherein said spacer is formed of at least two circumferential segments so that it can be expanded radially.

7. The method claimed in claim 6 wherein said spacer comprises segments initially attached circumferentially to each other in a separable manner.

8. The method claimed in claim 1 wherein said spacer has an external edge having an overall contour in plan view similar to that of said hole in said tubular part.

9. The method claimed in claim 1 wherein said spacer has an internal edge which has an overall contour in plan view similar to that of said hole in said tubular part.

* * * * *